United States Patent
Cooke et al.

[19]

[11] Patent Number: 5,921,404
[45] Date of Patent: Jul. 13, 1999

[54] COMPACT DISC STORAGE SYSTEM

[76] Inventors: Raymond J Cooke, 27 Eleven O'clock Rd., Weston, Conn. 06883; Joseph J. Franzino, P.O. Box 112252, Stamford, Conn. 06911-2252

[21] Appl. No.: 08/230,394

[22] Filed: Apr. 20, 1994

[51] Int. Cl.⁶ .................................................. A47F 5/00
[52] U.S. Cl. .................................. 211/40; 211/88; 211/94
[58] Field of Search ................................. 211/40, 41, 88, 211/94; 312/9.9

[56] References Cited

U.S. PATENT DOCUMENTS

| 4,358,018 | 11/1982 | Wolfe | 211/41 |
|---|---|---|---|
| 4,629,067 | 12/1986 | Pavlik et al. | 211/40 X |
| 5,027,955 | 7/1991 | Shoemaker et al. | 211/40 |
| 5,215,198 | 6/1993 | Sutton | 211/40 |
| 5,333,741 | 8/1994 | Yong | 211/40 |
| 5,346,078 | 9/1994 | Ernetoft | 211/40 X |

*Primary Examiner*—Robert W. Gibson, Jr.

[57] ABSTRACT

A block of material rectangular in form, with a number of shaped slots running the length of the block that accommodate the insertion of the common cases which hold a compact disc (FIG. 1). At opposite ends of the block rest complementing joints (24, 30) for union of consecutive units. In addition a couple (38) allowing union of units at an angle for a separate application.

9 Claims, 8 Drawing Sheets

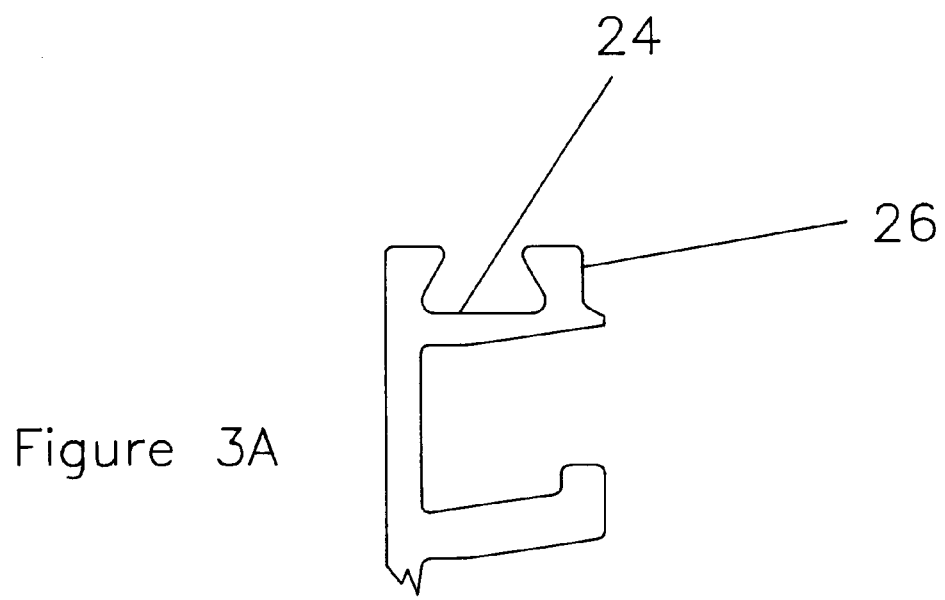
Figure 3A
Figure 3B
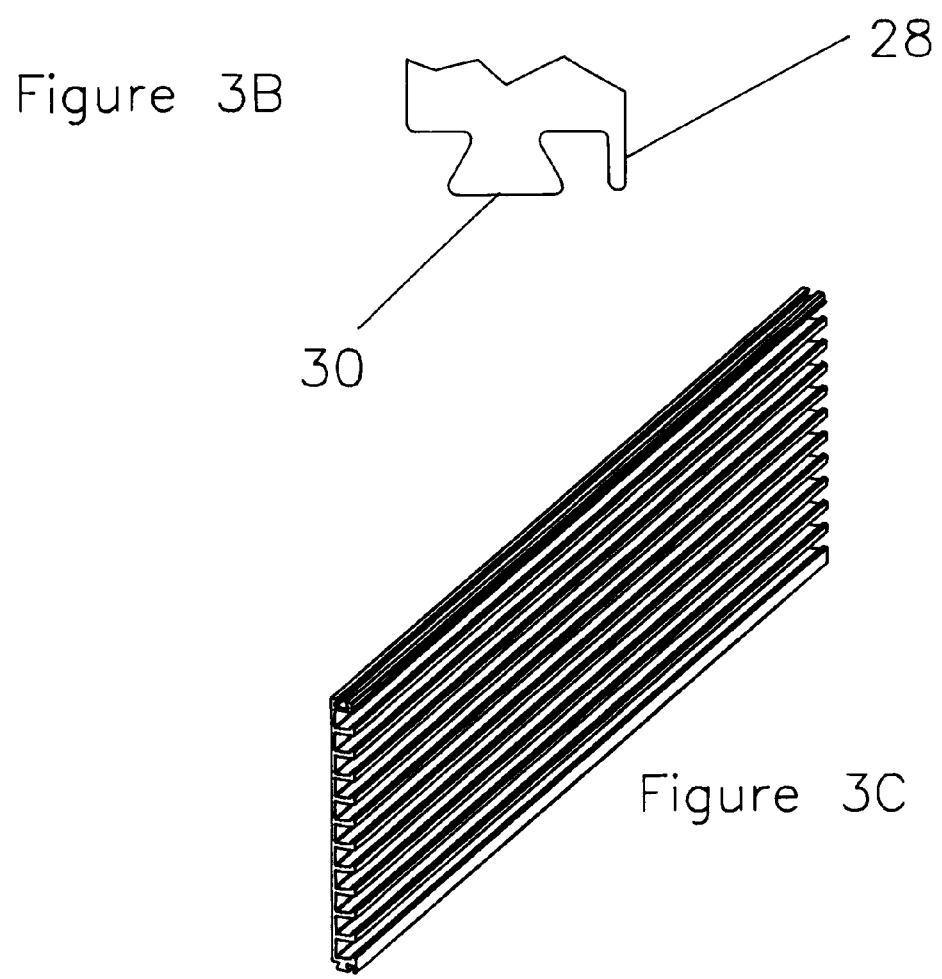
Figure 3C

Figure 4A — 36

COMPACT DISC STORAGE SYSTEM

BACKGROUND OF THE INVENTION

1. Field of the Invention

This invention relates to the display and storage of compact discs. This includes all compact discs that now use the standard plastic "jewel case" or the cardboard fold up container.

2. Description of The Prior Art

Upon conducting a search for prior art no patents were found relating to the storage system. Prior art is reviewed on a general basis in relation to what is presently available to the consumer. The compact disc (CD) has already become the preferred medium for playing prerecorded music on personal and public sound systems. It's universal acceptance is also becoming apparent in retaining data for personal computers. Most CDs are held in a protective plastic case called a "jewel box" whose measurements have become standardized at approximately 0.40×4.90×5.60 inches.

The methods for storing and displaying CDs have followed several formats. A flood of small firms market different types of boxes to hold any given number of CDs. Some boxes hold the CD upright individually, others feature long horizontal openings to hold a number of CDs resting side by side on one another. For expansion the consumer is expected to stack the boxes on top of each other.

CD storage has also utilized free standing towers and book case design cabinets. The majority of free-standing towers are being constructed in two basic forms. One is out of metal in a wire frame design and the second is folded sheet metal slotted to hold the CD. Most tower displays do hold the CD's horizontally, making title reading much easier. CD book cases are found with or without doors and may hold anywhere from 300 to 750 CDs in one case. The book case still holds the CDs in the same fashion as storage boxes. Because the CD is a relatively new technology, with world wide acceptance, present storage systems still lack many desirable features.

FLAWS OF PRESENT STORAGE SYSTEMS

1) The front edge of a jewel box measures 0.40×4.90 inches; it is on this surface that the title of the CDs contents is found. In order to maximize storage space, this front edge is also the only surface seen when a CD is in storage. Very much like the way one finds books stored in a bookcase or the public library. Although people are not accustomed to reading vertical lines, most currently available storage systems hold CD cases in a vertical position.

2) Many storage systems have large rectangular openings where the jewel boxes are placed side by side vertically. Side by side jewel boxes necessarily find support from their neighbors. As a CD is removed, the neighboring units are free to fall about. If the rectangular opening is not small enough to confine the CDs they often find their own resting place. To ensure a neat appearance or some form of reliable cataloging, the rectangular openings require constant maintenance when in use. This storage approach is common in most bookcase and box like systems.

3) The sales of compact discs are on an apparently never ending rise. Individual's collections are constantly growing. Storage systems must accommodate collectors. In box storage, boxes are stacked horizontally or vertically; functional but hardly aesthetic and still suffer from the problems previously noted above. Bookcase's are free standing but absorb valuable floor space. Many storage units are intended for small displays, providing no growth potential. Even storage system purchased from a large retailer (such as Radio Shack, a Tandy Company) are normally obsolete within months. It is very difficult to find a truly modular storage system.

4) The lack of durable, dependable storage suitable for heavy use. Most box and bookcase units are either made of wood and or plastic. Both materials have several intrinsic disadvantages. Wood tends to be heavy because it needs bulk for support. The integrity of certain finishes remain questionable and wood can easily be affected by its environment. Plastic is also subject to climatic variations, changing shape and color due to direct sunlight or temperatures fluctuations. These materials are obviously not suitable for long term use in public or commercial applications.

5) Present storage systems are designed for singular applications. A system is designed to perform in only one configuration. A bookcase system must be used as a bookcase and a Box system must be used in a box mode, although both may sometimes be wall mounted. Any wire frame towers or table top storage bins must be used in ether a horizontal or vertical fashion. Present storage systems do not offer more then one general way of storing or presenting CDs. If an individual's needs or environment changes they often need a new storage system.

SUMMARY, RAMIFICATIONS, AND SCOPE

Accordingly, the reader will see that the storage system for compact discs is an innovative and highly practical invention. This unique system may be used in three separate ways to display and store CDs. The front face of a jewel box is held in a horizontal position making title reading easy and pleasant. The system is modular, capable and suitable for displaying a small collection of fifty CDs or a library of thousands both with the same degree of effectiveness. Furthermore, The storage system has additional advantages;

The ability to expand one's collection and maintain constant uniformity. The storage system is modular in design and offers three configurations and unlimited growth potential.

Its design leads to easy repeatability, all parts are the same in size and finish. The preferred method of construction will be aluminum extrusion.

Its materials, ability to store CDs in the same position over long periods of time will be unaffected by climactic changes.

It may be used to display CDs in three configurations: mounted to a wall, by joining lengths back to back at an angle to form a tree display or by placing lengths on a flat horizontal surface such as a table top.

Although the above description contains many specifications, these should not be construed as limiting the scope of the invention. For example, the units may be made in several different sizes at different lengths with any number of slots; dovetails are not the only joint permissible to provide a union between consecutive units, angles given may change provided dimensions change accordingly so CDs are presented flat and horizontal when at rest, etc.

Thus the scope of the invention should be determined by the appended claims and their legal equivalents, rather then by the examples given.

OBJECTIVES AND ADVANTAGES

Several objectives and advantages of the present invention are listed:

a) The front edge of a jewel box, which holds the title of the CD on its face, is presented in a horizontal position. Each row of CDs is spaced an equal distance apart which also aids easy reading.

b) Each CD that is placed in storage is held independently. CDs are not free to move about as their neighboring counterparts are moved in and out of storage.

c) The storage system units can be made in any length suitable for a given number of CDs. Each unit may be inter-linked with the next. Two sections of any lengths slide together to form one storage unit. There is no limit to the number of lengths that may be joined together. The system is modular in its expansion.

d) There is a very limited number of parts. Each length is made of one solid piece e) All lengths are to be formed from a solid medium such as aluminum. Shape, texture and finish are easily held constant. Units made years apart are completely compatible.

f) Constructed with public and commercial service capabilities.

g) The storage of CDs may be presented in three separate fashions, high degree of versatility.

Lengths can be wall mounted.

Lengths can be joined to form a tree (double sided table top display).

Lengths can be placed on a horizontal surface, angled table top display.

Additional objectives and advantages are to: Provide a convenient user friendly storage system. An adaptable system, that can change with different needs. A system that may be used to store and display Compact Discs in several different ways. A system that has unlimited growth. Capable and suitable for large scale heavy use.

BRIEF DESCRIPTION OF THE DRAWING

FIGS. 3A, 3B and 3C show a detailed view of the top and bottom of each unit.

| Reference Numbers in drawings | |
|---|---|
| 10 upper landing | 12 lower landing |
| 14 distance between landing | 16 upper relief |
| 18 lower relief | 20 step |
| 22 stop | 24 female dovetail |
| 26 tail relief | 28 tail |
| 30 male dovetail | 32 face |
| 34 rear wall | 36 felt pads |
| 38 couple | 40 mounting holes |
| 42 adjustable brace | |

DESCRIPTION OF THE PREFERRED EMBODIMENTS

The storage system may be used in three separate configurations. It is assumed that the majority of applications will indicate a preference for wall mounting, followed by horizontal table top and back to back tree form designs. It is in this order that a description is made. There are three tangible parts to the storage system, a modular (the unit that holds the cases), the tree top couple and the adjustable brace. The couple and brace are used to construct a back to back tree display storage system.

Figure 1A:
FIGS. 1A and 1B show one unit of storage system.

In a simplified view, the storage system is a rectangular block of material measuring so thick by so high and may be in any given length. This block has several slots that run the length and are stacked along the height. These slots are of dimensions that allow the insertion of a CD case. At the top and bottom of each block there are complementing joints that allow any number of blocks to be joined together. FIG. #1B provides a perspective view of such a block. FIG. 1A is an end view of the same. For descriptive convenience the various points of the unit details are given on the basis that the unit is being held in the vertical position as in FIG. 1A. This is how each unit will rest when mounted to a wall.

Figure 1B:
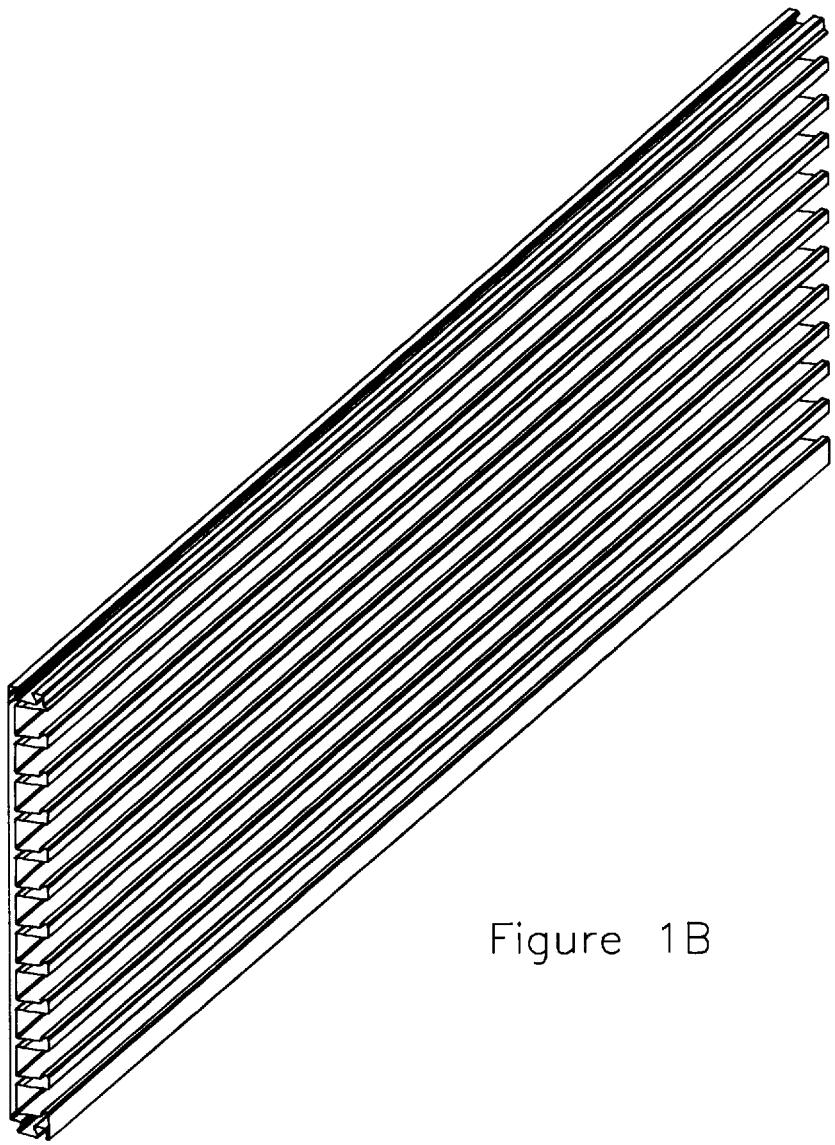

As one with any knowledge of manufacturing knows the unit in FIG. 1 may be produced using several different procedures. One may start with a solid rectangular block and machine the block to the desired dimensions. The unit can also be formed in a mold. Looking at the cost of production, materials, the strength and finish of the final product the preferred method is extruding with aluminum. One of the advantages to extruding is that the consistency of dimensions is easily held.

Figure 2A:
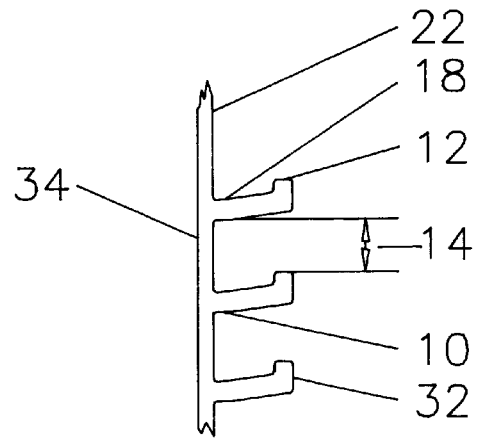
FIGS. 2A and 2B show details of the slots that support the jewel cases (CDs).
Figure 2B:
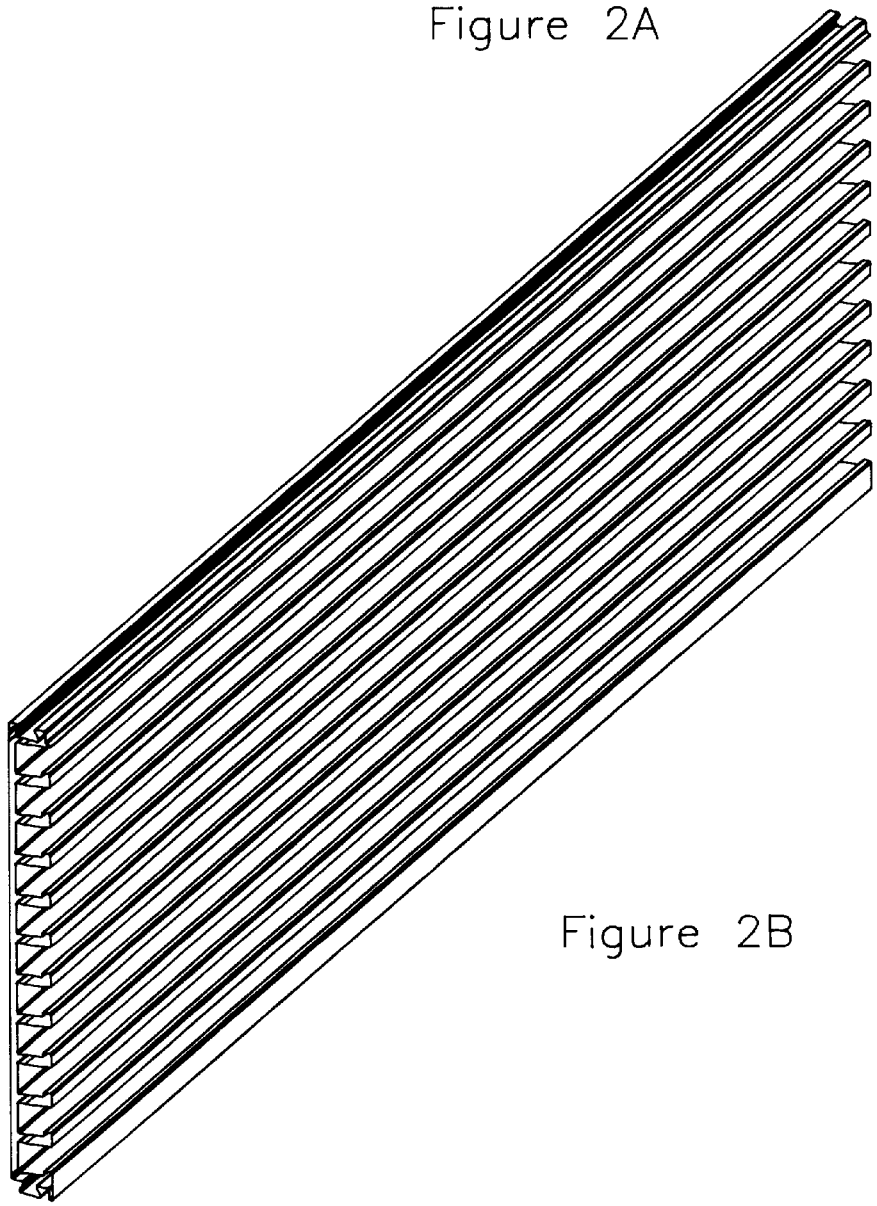

In FIG. 2 details of the slots are shown. The upper landing 10 and the lower landing 12 are the two surfaces a jewel box will come to rest upon when the storage system is mounted to a wall. Both of these landings are flat and horizontal for a short distance and are parallel to each other. The distance between these two landings 14 must correspond to the thickness of a jewel box. In front of the upper landing is the upper relief 16. This relief is angled upward at 8 degrees from the upper landing to the face 32. Just behind the lower landing is the step 20, this drops vertically from the lower landing to the lower relief 18. The lower relief is angled down and back from the step at 8 degrees. The lower relief runs from the step to the stop 22.

Reviewing FIG. 2 the relation between several dimensions are important. Distance between landings 14 is most important, 0.412 inches in displacement. The tolerance of this dimension should be held to plus or minis 0.005 inches. All other dimensions are less critical but should be consistent throughout all locations. Several dimensions may be changed without affecting performance of the unit. Distance between rear wall 34 and the stop 22 may be enlarged without impunity but less then an ⅛" thickness will affect strength. The height of each face 32 may be increased to provide more space between rows of stored CDs. This height should not be too small as this will degrade ease of operation. The width of each landing is not critical but they should be flat and parallel to each other. In the preferred method of production (aluminum extrusion) dimensions that will provide adequate strength and conserve materials are easily produced without high machine costs.

Complementing joints are found at the top and bottom of each unit. At the top of each unit is a female dovetail. At the bottom of each unit is a male dovetail. Dovetails are common joints used throughout the world so there is no need for detailed description. It must be noted that these joints have a clearance fit. The male dovetail of one unit will slide into the female dovetail of any other unit. The dimensional consistency of these joints, between units must be held very closely.

In FIG. 3 a detailed end view of the top and bottom of each unit is given. FIG. 3A is the top of each unit. The female dovetail 24 and the tail relief 26 is shown. The tail relief is simply an area of clearance that the tail 28 comes to rest in as any number of units are joined together. The tail and its relief are cosmetic in nature. In FIG. 3B the bottom of each unit is shown. The male dovetail 30 and the tail are seen. The purpose of the tail is to hide the male dovetail from direct view providing a finished look. Its dimensions, height and thickness are not critical. The tail and tail relief must fit together with a clearance fit, they hold no structural importance.

Figure 4B:
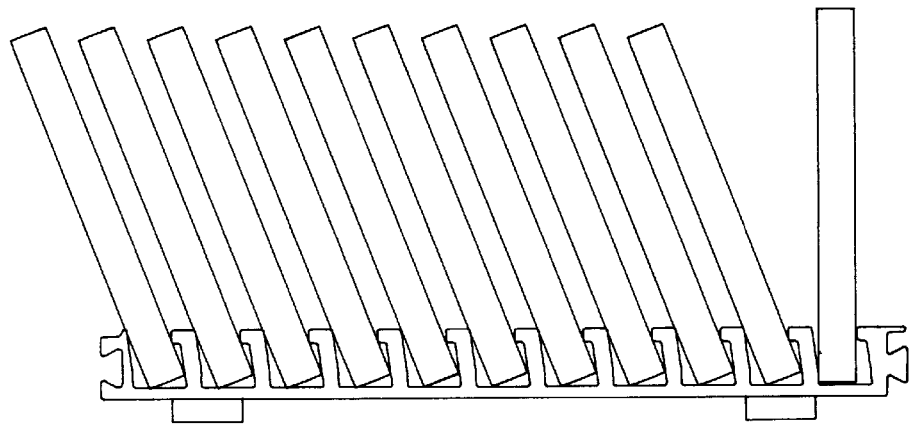
FIG. 4 shows an end view of a unit when used in the table top display with a jewel box in position.
Figure 4B:
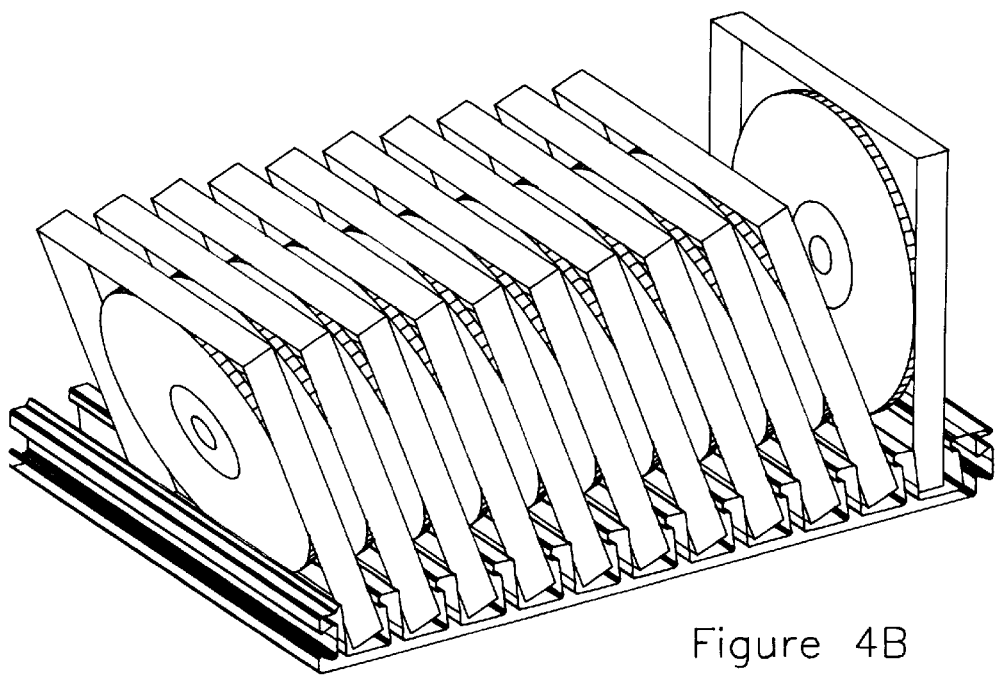

When a unit is used in horizontal position (table top display) the function of several points change. FIG. 4 is an end view of a unit in the horizontal position. Several jewel boxes are shown inserted at their resting position. The jewel box is supported by three points: the upper relief, the lower relief and the lower landing. The jewel box comes to rest at an angle of 67 degrees from the horizontal. The function of the end joints and all dimensions remain unchanged. When used in horizontal position felt pads 36 are placed on the rear wall for a secured footing. Self adhesive felt pads are commercially available in a wide variety of shape, color and size.

Figure 5A:
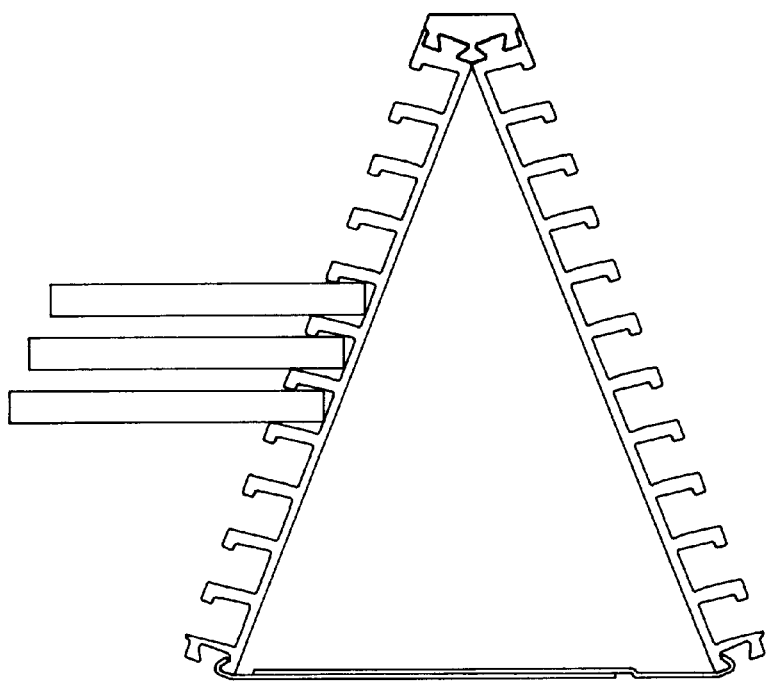
FIG. 5 shows an end view of two units when used in a tree top display with a jewel box in position.
Figure 5B:
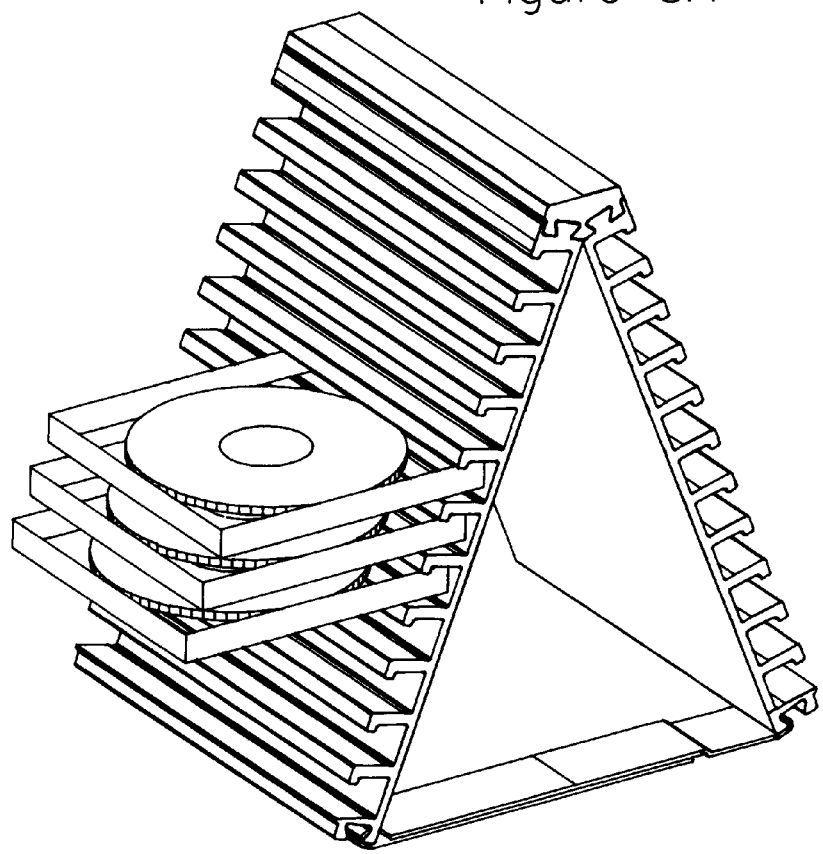

In the storage system's third configuration, a tree display, an even number of units may be joined. Two units are place at angle back to back with their male dovetails on top close to each other. The two male dovetails are held in close proximity by a piece with two complementing female dovetails. FIG. 5 provides an isometric and end view of this arrangement. It should be noted the units are now upside down in relation to their placement when used in a wall display. The display is enlarged by joining additional units to each side.

Figure 6A:
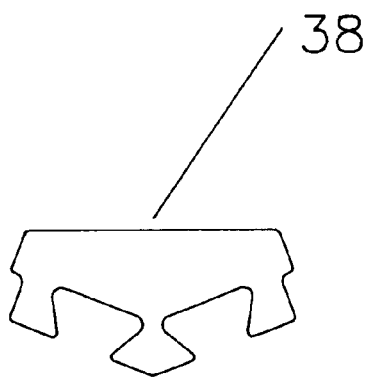
FIG. 6 shows an end view of the couple used to form a tree display.
Figure 6B:
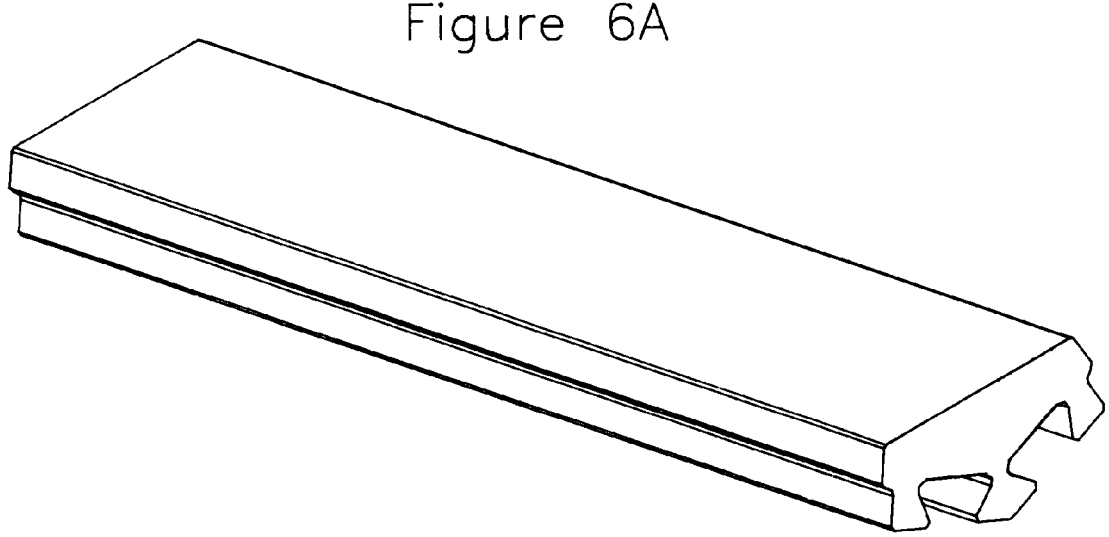
Figure 7A:
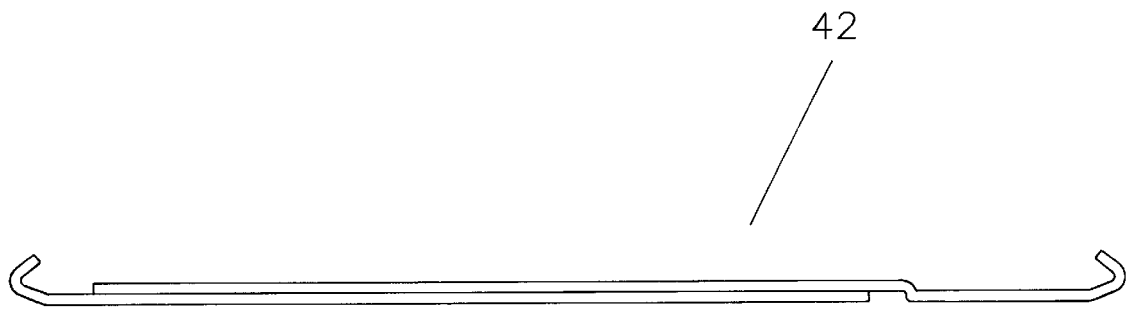
FIG. 7 shows the adjustable brace used for a tree display.
Figure 7B:
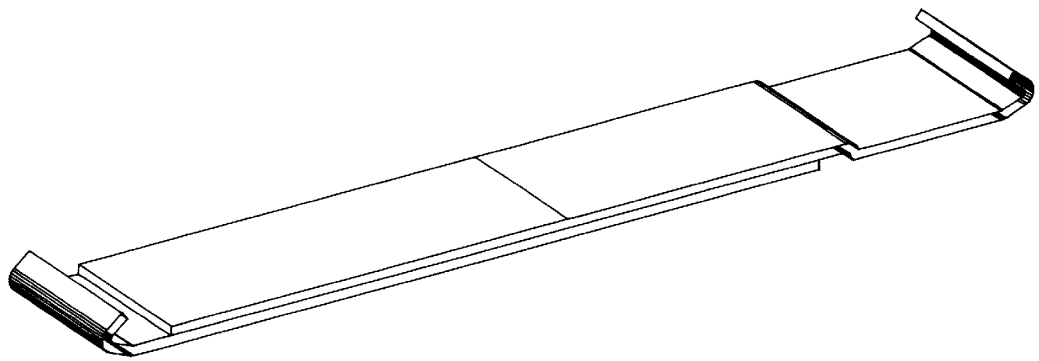

In FIG. 5 the couple 38 is used to join two units of the storage system together to form a double sided tree display. FIG. 6 provides a blown up view of the couple. A solid piece of material with two female dovetails held at a given angle. It is this angle that must be held at 46 degrees between center lines of the female dovetails. In FIG. 6 an end view is given, the length of a given couple will match the length of the units to be joined. Other then two female dovetails at a given angle, the shape of the couple is cosmetic in nature, the flat top holds no importance. It must be noted that the female dovetails on the couple and the male dovetails on each unit have a clearance fit (they slide within each other). The adjustable brace 42 (FIG. 7) is used in conjunction with the couple. The brace holds the display from spreading at the base. The brace can be seen in position on FIG. 5.

With the couple in place, when a jewel box is placed in storage it shall come to rest in the horizontal position. The jewel box finds support from the same three points as when the units are used in a table top display. Support is provided by the upper relief, the lower relief and the lower landing.

From the description above, several advantages of this compact disc storage system become evident:

(a) The storage system is modular, expansion is unlimited by design.
(b) The storage system is simple in design. Each unit is a solid piece of material.
(c) By using the preferred method of production (aluminum extrusion) fit, finish and dimensions are all held to a high degree of consistency. Two units produced several years apart will: look, feel and function the same way.
(d) The system is highly versatile, it may be used in three different configurations.
(e) Because of the design, solid construction and the fact that units may be produced in any given length, the storage system is well suited to individual and commercial use.

OPERATION—FIGS. 4, 5, 8

Since there are three configurations the operation of each is reviewed separately.

Figure 8A:
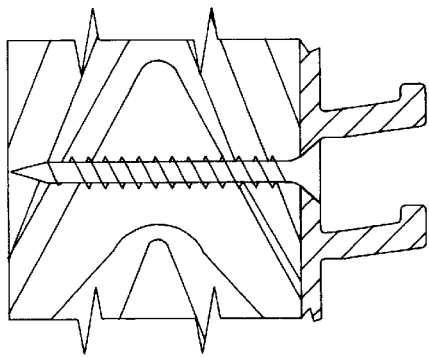
FIGS. 8A, 8B, 8C and 8D show a sectional view of a unit mounted to a wall.
Figure 8B:
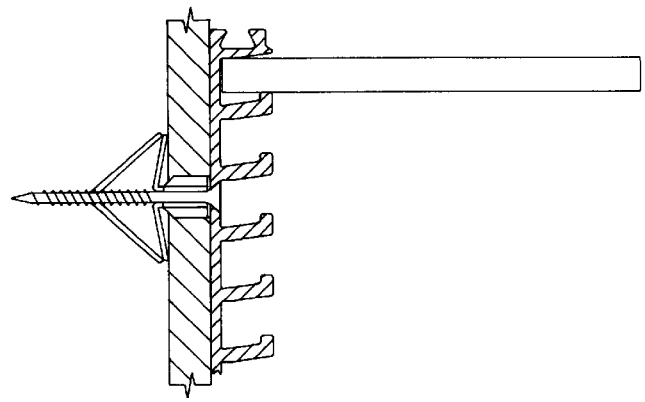
Figure 8C:
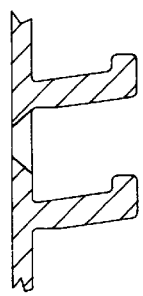
Figure 8D:
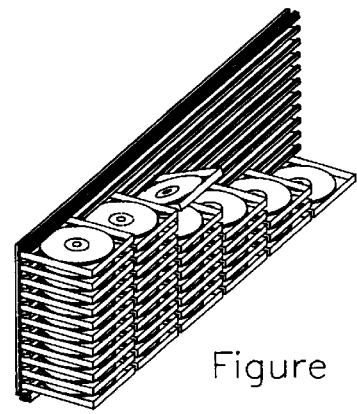

First there is a wall mount display. This is where any number of units may be mounted to a vertical wall to display and store compact discs. All units are provided with mounting holes 40 as shown on FIG. 8C, these holes are drilled and counter sunk to accept common number 7 through number 10 flat head screws. These holes are spaced to accommodate standard 16 inch stud framing. In FIG. 8 an end view of a unit is shown mounted to a wall. FIG. 8A shows a unit mounted to a wall stud. Using a common wood screw, the screw is placed in a mounting hole and driven into the stud. FIG. 8B shows a unit mounted to a wall using a common wall anchor. Mounting hole locations are marked and drilled on a wall, anchors are set in position and a unit is mounted via the anchors. There are many readily available wall anchors that will serve this purpose. Any number of units may be joined together by use of there complementing joints. Whether there is one or ten units joined together and then mounted to a wall, all units should have their own mounting screws.

Once the unit(s) are mounted, jewel boxes may be placed in storage. Each jewel box is placed in storage by holding the front face of the box horizontal and sliding the box into a slot until it comes to rest on the stop. When the hold on the box is released the jewel box will settle into its resting position. Placement of each box has no importance, this is up to the tastes and needs of the user. To remove a CD case from storage one grips the front edge of a case and pulls it from the storage system. There is a natural tendency to lift an object as it is pulled. This tendency helps to release the case from its resting position.

Second there is a table top display. Again any number of units may be joined together. Self stick felt pads are placed on the rear wall to aid in firm footing and to protect the surface that the units come to rest on. The units are placed in a horizontal position, see FIG. 4. Jewel boxes are placed in and out of storage as described above now working from a near vertical position. The CD cases will come to rest at an angle of 67 degrees. Units should be placed so the cases angle towards the user, this promotes easy reading of titles. When in a table top display cases may be tilted up to a vertical position, this range of motion aids in placement and sorting.

Thirdly there is a tree top display. In this display an even number of units must be used. There must be an equal number of units on each side of the display, may it be 1, 2 or 3 units to a side. The units on each side are joined together by the dovetails. In relation to the wall display the units are held upside down and joined by the couple. The couple holds the two sides together at the top and allows the sides to rest at an angle down and out from the peak. The couple uses two female dovetails to hold onto the male dovetails of any given two units. At the base of this display is the adjustable brace. The brace may be set for the spacing of 1, 2, or 3 units per side. The brace is set into the female dovetails and holds the base of the display from spreading outward.

Once the tree top display is assembled and placed on a horizontal surface jewel boxes may be placed in and out of storage. The jewel boxes are placed in and out of storage as described above in the wall display. In this display the CDs again rest with their front face held horizontally, see FIG. 5. They are also staggered as the rows climb up the tree. This does aid in visually separating the jewel boxes and is cosmetically pleasing to the eye.

We claim:

1. An interconnectable modular storage system for flat, rectangular articles such as compact discs, computer discs or audio cassettes comprising:

a storage unit which has a generally rectangular shape, the storage unit having a flat base and a plurality of equally spaced slots projecting outwardly from the base at a length substantially less than one fourth the width of an article to be stored, wherein said slots, a pair of landings, a pair of reliefs and a rear wall provide means for receiving and holding an edge portion of the article to be stored and supporting means for supporting the article in a horizontal orientation when the flat base is mounted on a vertical surface or at 25 degrees off a vertical orientation when the flat base is placed on a horizontal surface, the storage unit having a plurality of interlocking joints positioned at a top and a bottom of the flat base for providing union of an unlimited number of said storage units.

2. The storage system as claimed in claim 1, wherein the interlocking joints are dovetails.

3. The storage system as claimed in claim 1, wherein said storage unit has a length equal to one-third the width of an article to be stored for single column storage.

4. The storage system as claimed in claim 1 further comprising a connector with complementing joints to the interlocking joints on said storage unit, for joining two units back to back at an incline equal to approximately 50 degrees as measured through a center line of said joints, thereby permitting two sided storage of articles.

5. The storage system as claimed in claim 1, wherein the pair of landing are an upper Landing and a lower landing, perpendicular to said base and parallel to each other, a perpendicular distance between said landings being equal to the width of an article to be stored, the upper landing being adjacent to and perpendicular to the rear wall which is parallel to said base; and wherein the pair of reliefs are an upper Relief and a lower relief located adjacent to said upper and lower landings.

6. The storage system as claimed in claim 5 wherein the upper and lower reliefs are angled away from said landings at approximately 8 degrees, the upper relief extending from said upper landing towards said base, the lower landing sloping back to said rear wall, said reliefs being parallel to each other to act as stops when articles are stored in a 25 degrees off vertical orientation.

7. The storage system as claimed in claim 1, wherein said storage unit has an indefinite length equal to a multiple of the width of an article to be stored.

8. The storage system as claimed in claim 1, further comprising an adjustable base for holding upright ends of a pair of storage units to prevent spreading.

9. The storage system as claimed in claim 1, further comprising at least one hole extending through the flat base for accepting a fastener therein.

* * * * *